United States Patent [19]

Masumoto et al.

[11] Patent Number: 4,973,369
[45] Date of Patent: Nov. 27, 1990

[54] ALLOY CATALYST FOR OXIDATION OF HYDROGEN

[75] Inventors: Tsuyoshi Masumoto; Akihisa Inoue, both of Sendai; Hisamichi Kimura, Azatoubeihashi; Hatsuo Hirono, Nyuzen; Koichi Moriyama, Uozu; Hideo Fukui, Kurobe, all of Japan

[73] Assignees: Yoshida Kogyo K.K., Tokyo; Tsuyoshi Masumoto, Sendai, both of Japan; a part interest to each

[21] Appl. No.: 518,815

[22] Filed: May 4, 1990

[30] Foreign Application Priority Data

May 11, 1989 [JP] Japan .................................. 1-116024

[51] Int. Cl.$^5$ ...................... B01J 23/76; B01J 27/185; C22C 19/07; C22C 16/00
[52] U.S. Cl. ..................................... 148/421; 148/13; 148/133; 148/425; 502/325; 502/349
[58] Field of Search ................. 148/13, 133, 421, 425; 502/325, 349

[56] References Cited

U.S. PATENT DOCUMENTS

| | | | |
|---|---|---|---|
| 2,999,075 | 9/1961 | Pruett | 502/325 |
| 3,752,774 | 8/1973 | Stiles | 502/325 |
| 3,829,393 | 8/1974 | Sutherland et al. | 502/325 |
| 4,026,823 | 5/1977 | Van Hook et al. | 502/325 |
| 4,171,992 | 10/1979 | Tanner et al. | 148/13 |
| 4,735,789 | 4/1988 | Franzen et al. | 148/403 |
| 4,814,002 | 3/1989 | Grasselli et al. | 148/13 |

FOREIGN PATENT DOCUMENTS

| | | |
|---|---|---|
| 58-210860 | 12/1983 | Japan . |
| 59-109244 | 6/1984 | Japan . |
| 63-69543 | 3/1988 | Japan . |

OTHER PUBLICATIONS

Lunin et al., "Effect of Composition on the Catalytic Properties of Zirconium-Cobalt Intermetallic Compounds for the Hydrogenation of Carbon Monoxide", Inv. A Kad. Nauk SSSR, Khim., Apr., 1985, Metals Ab. #85-340980.

Primary Examiner—Theodore Morris
Assistant Examiner—David Schumaker
Attorney, Agent, or Firm—Flynn, Thiel, Boutell & Tanis

[57] ABSTRACT

The specification discloses an alloy catalyst for oxidation of hydrogen which is prepared by heat treating a material comprising an amorphous alloy represented by the formula: $Zr_xCo_{(100-x)}$ (wherein 10 atomic $\% \leq X \leq 80$ atomic %), according to the following three-steps in an oxidizing atomsphere: first heat-treatment step at a temperature at which the foregoing alloy stably exists as an amorphous single phase; second heat-treatment step at a temperature at which the alloy exists as a mixed phase of a metastable phase and an amorphous phase; and third-heat treatment step at a temperature at which the alloy is entirely transformed into a crystalline phase. The alloy catalyst of the present invention is a highly active catalyst for oxidation of hydrogen and exhibits a superior catalytic efficiency especially in catalytic combustion of hydrogen and in deoxidation and dehydrogenation of a gas mixture of hydrogen and oxygen.

1 Claim, 5 Drawing Sheets

4,973,369

ALLOY CATALYST FOR OXIDATION OF HYDROGEN

BACKGROUND OF THE INVENTION

1. Field of the invention

The present invention relates to an alloy catalyst for oxidation of hydrogen exhibiting a superior catalytic efficiency especially in catalytic combustion of hydrogen and deoxidation and dehydrogenation of a gas mixture of hydrogen and oxygen.

2. Description of the Prior Art

Amorphous metals include many atoms which offer catalytically active sites because of their unsaturated coordination and such atoms are uniformly distributed throughout the amorphous metals. Therefore, amorphous metals have an increased catalytic activity per atom as compared with crystalline metals and have been greatly expected as highly active catalytic materials.

Generally, amorphous alloys prepared by liquid rapid quenching processes have small surface area. Therefore, even if the amorphous alloys have a high catalytic activity per atom in the surface part thereof, the activity per unit weight is disadvantageously small.

SUMMARY OF THE INVENTION

Therefore, an object of the present invention is to improve the foregoing problems and provide a highly active alloy catalyst for oxidation of hydrogen.

According to the present invention, there is provided an alloy catalyst for oxidation of hydrogen which is prepared by heat treating a material comprising an amorphous alloy represented by the formula: $Zr_xCo_{(100-x)}$ (wherein 10 atomic % $\leq x \leq$ 80 atomic %), according to the following three steps in an oxidizing atmosphere:

first heat-treatment step at a temperature at which the foregoing alloy stably exists as an amorphous single phase;

second heat-treatment step at a temperature at which the alloy exists as a mixed phase of a metastable phase and an amorphous phase; and third heat-treatment step at a temperature at which the alloy is entirely transformed into a crystalline phase.

DETAILED DESCRIPTION OF THE PREFERRED EMBODIMENTS

Figure 1:
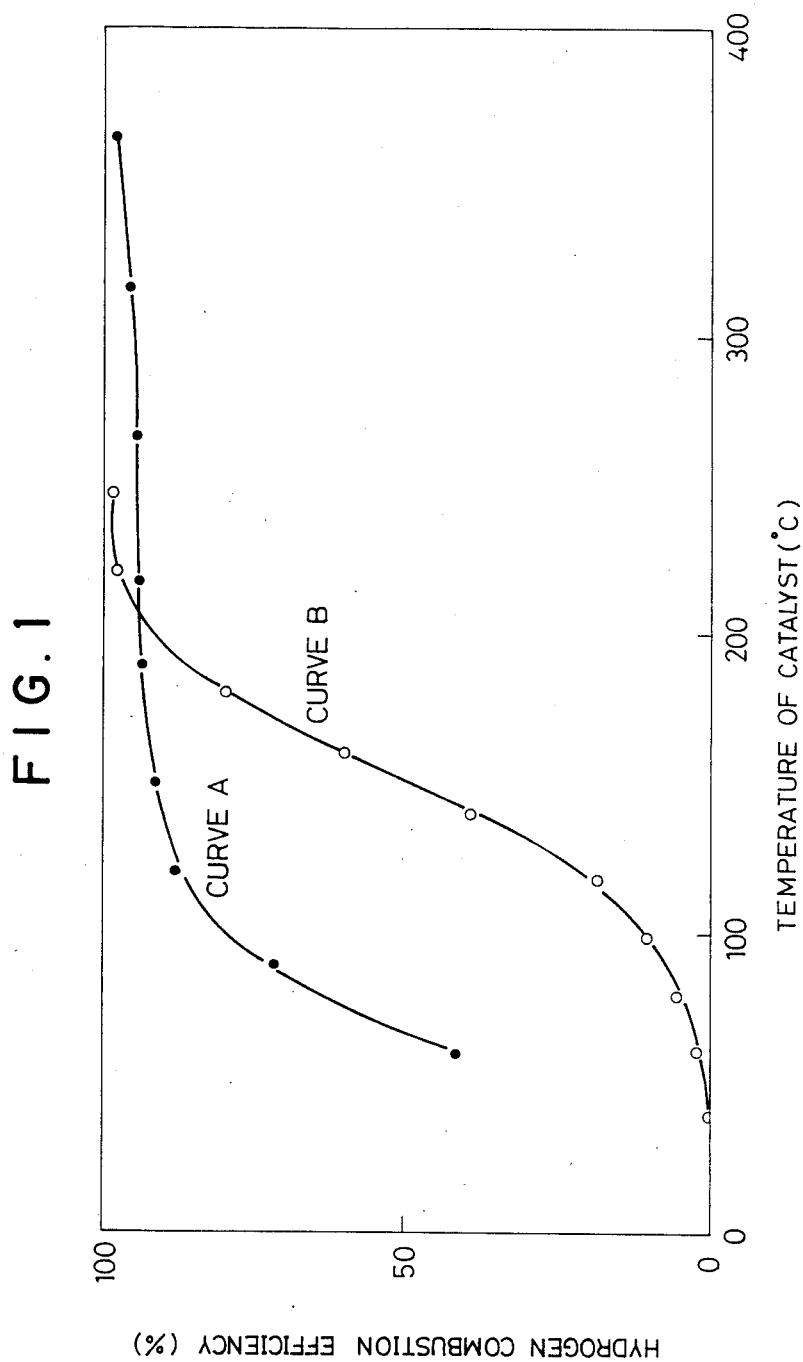
FIG. 1 is a graph showing the catalytic efficiency of the catalyst of the present invention in combustion of hydrogen.

The amorphous alloy which is used in the present invention can be prepared by rapidly solidifying a melt of the alloy having the above-defined composition thorough liquid quenching processes. The liquid quenching processes are known as processes to rapidly cooling a molten metal at a cooling rate of the order of $10^4$ to $10^6$ K/sec and, for example, single-roller melt-spinning process and twin-roller melt-spinning process are particularly effective. However, besides these processes, the amorphous alloy may be also obtained in the form of thin ribbons, flakes and particles by vacuum deposition, sputtering, ion plating, chemical vapor deposition (CVD), atomization, spraying or the like. Therefore, among the foregoing known processes, the most preferable production process is employed according to the used form of the catalyst.

In the hydrogen oxidizing alloy of the present invention represented by the foregoing general formula, the atomic percentage "x" is should be in the range of 10 atomic % to 80 atomic %, since when "x" strays from the range, formation of an amorphous structure becomes difficult.

The respective temperature ranges of the above-mentioned oxidizing heat-treatment steps for the amorphous alloy may be determined, for example, by means of differential thermal analysis and scanning thermogravimetric measurements. The temperature in the first heat-treatment step is below the temperature at which crystallization of the foregoing amorphous alloy begins and the temperature range in the third heat-treatment step is above the temperature at which the amorphous alloy is entirely transformed into a crystalline phase. The temperature of the second heat-treatment step ranges between the temperature of the first step and the temperature of the third step. It is preferred that the temperature of the first heat-treatment be in the vicinity of the temperature at which crystallization begins.

When the above-mentioned amorphous alloy is subjected to the foregoing first heat-treatment step, Zr is concentrated to the surface part of the alloy. In the second heat-treatment step, the concentrated Zr in the surface is oxidized in preference to Co, thereby increasing catalytically active sites. Further, in the third heat-treating step, oxidation diffuses into the interior of the alloy and, at the same time, internal stress is generated. The internal stress causes cracks or the like and the alloy becomes porous and finer. Consequently, the specific surface area of the alloy is significantly increased and the catalytic activity is surprisingly improved.

Now, the present invention will be more specifically described hereinafter with reference to the following Examples.

Example 1

Zr metal and Co metal were mixed in a proportion of 70 atomic % (Zr) and 30 atomic % (Co) and an alloy of $Zr_{70}Co_{30}$ was prepared by vacuum arc melting furnace. Thereafter, an amorphous $Zr_{70}Co_{30}$ alloy was prepared by a liquid rapid quenching process employing a single-roller melt spinning method. In the preparation procedure by a single-roller melt-spinning method, the $Zr_{70}Co_{30}$ alloy was melted in a quartz tube having a small opening (diameter: 0.5 mm) by a high-frequency melting process and was ejected, under application of an argon gas pressure of 0.7 kg/cm$^2$, onto a copper roll rapidly rotating at a rotating rate of 4000 rpm so that the molten alloy was rapidly solidified on the surface of the roll.

The resulting amorphous alloy was subjected to three heat-treatment steps at 250° C. for 64 hours in air, at 300° C. for 170 hours in air and at 700° C. for 2 hours in air. The heat-treated alloy was comminuted and sieved to obtain an alloy catalyst for oxidation of hydrogen having a grain size of 38 to 106 μm.

A hydrogen combustion test was carried out using 0.3 g of the hydrogen oxidizing alloy catalyst ($Zr_{70}Co_{30}$) prepared under the above conditions. For the hydrogen combustion test, air containing 1% by volume hydrogen was fed at a flow rate of 100 ml/min and reduction in hydrogen due to the combustion was measured.

FIG. 1 shows the relationship between the temperature of the catalyst and the combustion efficiency for hydrogen. In the drawing, Curve A is for the above-mentioned catalyst of the present invention and Curve B is for a comparative catalyst of $Co_3O_4$ which was prepared by a conventional wet-type coprecipitation process. Among known base metal oxide catalysts, the coprecipitated $Co_3O_4$ catalyst for comparison has been recognized as the most active catalyst for oxidation of hydrogen.

As shown in FIG. 1, particularly in the lower temperature range, Curve A shows a very high hydrogen combustion efficiency as compared with Curve B and it is clear that the catalyst of the present invention has a very high activity in combustion of hydrogen.

Figure 2:
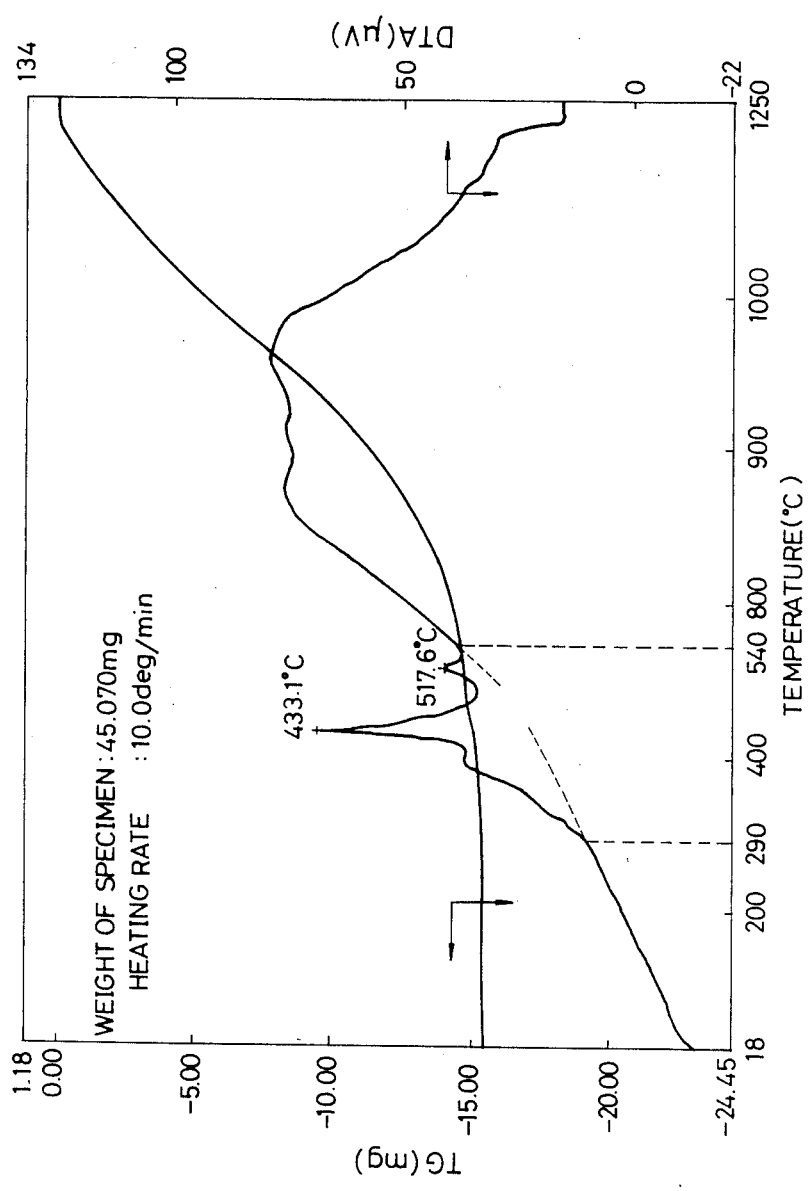
FIG. 2 is a graph showing the results of the thermogravimetric (TG) measurement and differential thermal analysis (DTA) in the transition of an amorphous state to a crystalline state for the catalyst of the present invention.

FIG. 2 shows the results of thermogravimetric (TG) measurements and differential thermal analysis (DTA) for the above $Zr_{70}Co_{30}$ amorphous alloy of the present invention ranging from the amorphous state to the crystalline state.

As will be seen from the DTA curve in FIG. 2, the above alloy of the present invention is present in an amorphous state at temperatures of 290° C. or lower and in a crystalline state at temperature of 540° C. or higher.

Further, as will be apparent from a considerable increase from 540° C. in the TG curve, oxidation of the foregoing alloy is greatly accelerated from that temperature.

Figure 3:
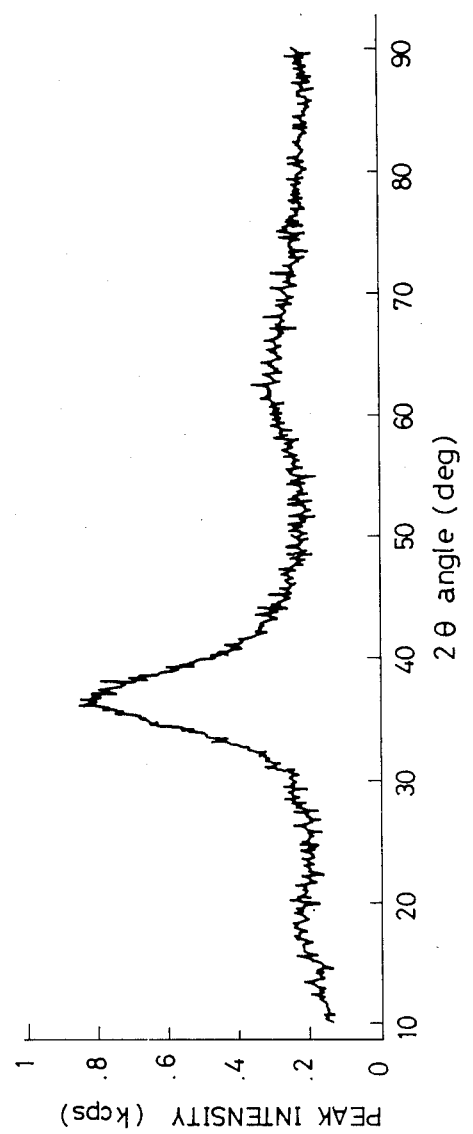
FIG. 3 is the X-ray diffraction diagram of an amorphous alloy before heat treatment.
Figure 4:
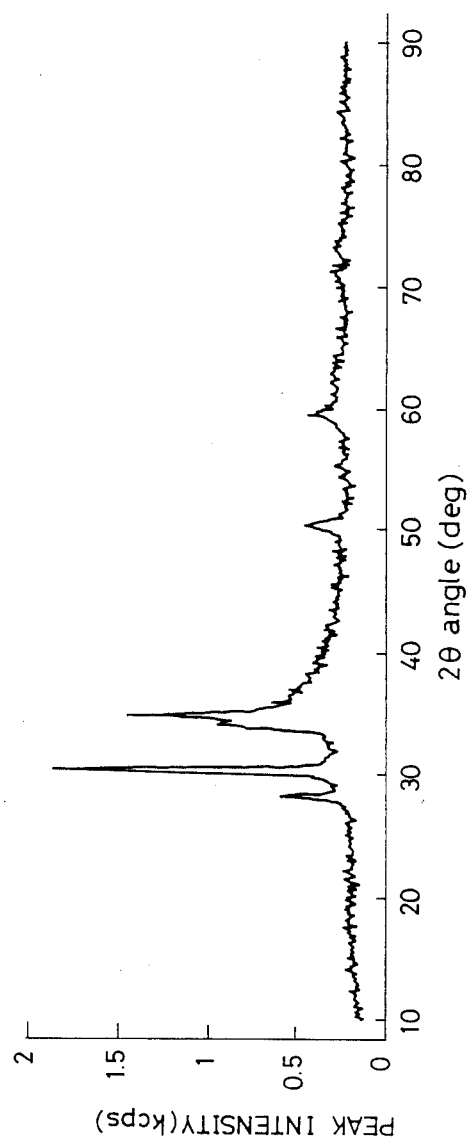
FIG. 4 is the X-ray diffraction diagram of an amorphous alloy heat treated at 300° C.
Figure 5:
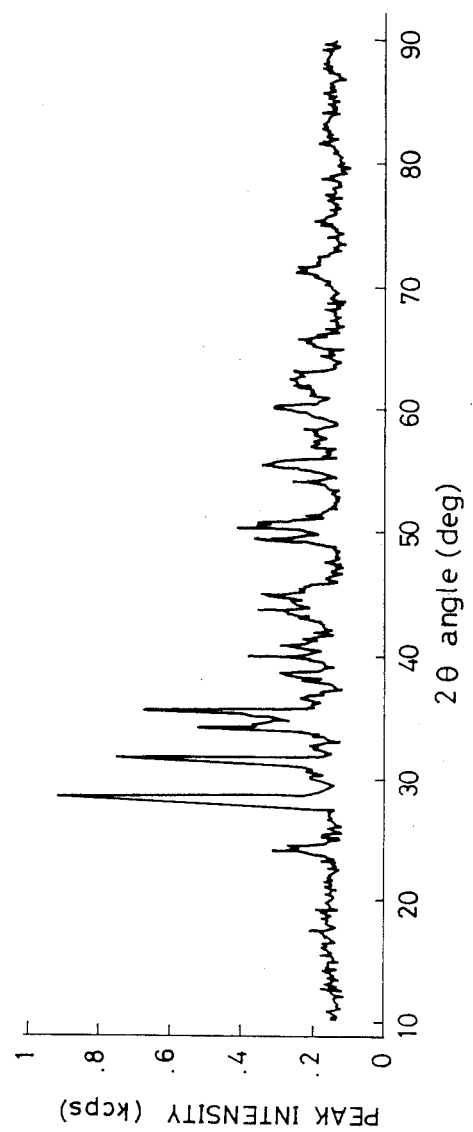
FIG. 5 is the X-ray diffraction diagram of an amorphous alloy heat treated at 700° C.

FIGS. 3, 4 and 5 are X-ray diffraction diagrams showing different stages of the foregoing alloy. FIG. 3 is an X-ray diffraction diagram for the alloy before heat treatment, FIG. 4 for the alloy heat treated at 300° C. and FIG. 5 for the alloy heat treated at 700° C. It can be confirmed from these X-ray diffraction diagrams that the alloy is present as an amorphous phase (FIG. 3), a mixture of a metastable phase and an amorphous phase (FIG. 4) and a crystalline phase (FIG. 5) in the respective stages.

Example 2

Table 1 shows the temperature ($T_\frac{1}{2}$) when the combustion percentage of hydrogen was 50 % and the specific surface area of each catalyst. $T_\frac{1}{2}$ was used for the evaluation of the catalysts because of its reproducibility and reliability and catalysts with a small $T_\frac{1}{2}$ value can be evaluated as highly active catalysts.

Specimen Nos. 2 to 8 shown in Table 1 were provided by preparing amorphous alloys under the same processing conditions as set forth in Example 1 and then carrying out oxidizing treatments on the resulting amorphous alloys under various oxidizing conditions as shown in the table. In order to prepare Specimen No. 9, the $Zr_{70}Co_{30}$ alloy was subjected to an oxidizing treatment without the step for the formation of an amorphous phase. The thus heat treated specimens No. 2 to 9 were tested for hydrogen combustion under the same conditions as described in Example 1. For comparison, the specific surface area of the amorphous alloy (Specimen No. 1) prepared in Example 1 is also shown in the same table.

Specimen No. 2 was subjected to the three-stepped heat treatment according to the present invention. Specimen No. 3 was subjected to only the second heat-treatment step, Specimen No. 4 was subjected to only the third heat-treatment step and Specimen No. 5 was subjected to the first and second heat-treatment steps. Specimen Nos. 6 and 7 were subjected to the second and third heat-treatment steps and Specimen No. 8 was subjected to the first and third heat-treatment steps.

From the results of these specimens, it will be seen that the alloy (Specimen No. 9) which was not subjected to the amorphous-phase forming step is very low in catalytic activity. Further, it will be noted that all of the three heat-treatment steps of the present invention are essential for the amorphous alloys.

The heat treatment in the third step is effective to obtain a greater specific surface area. However, it is impossible to achieve a satisfactorily improved catalytic activity only by the third step. It is necessary to form catalytically active sites on the surfaces of alloys by the first and second heat-treating steps.

TABLE 1

| Specimen No. | Oxidizing treatment | $T_\frac{1}{2}$ (°C.) | Specific surface area (m²/g) |
| --- | --- | --- | --- |
| 1 | untreated | | 0.29 |
| 2 | 250° C. × 64 hr<br>300° C. × 170 hr<br>700° C. × 2 hr | 69 | 1.57 |
| 3 | 300° C. × 300 hr | 255 | 1.50 |
| 4 | 700° C. × 2 hr | 330 | 1.22 |
| 5 | 250° C. × 64 hr<br>300° C. × 170 hr | 106 | 0.38 |
| 6 | 300° C. × 170 hr<br>700° C. × 2 hr | 270 | 1.73 |
| 7 | 300° C. × 234 hr<br>700° C. × 2 hr | 350 | 1.69 |
| 8 | 250° C. × 64 hr<br>700° C. × 2 hr | 260 | 1.42 |
| 9 | 500° C. × 5 hr | 355 | 1.35 |

As stated above, since the alloy catalyst of the present invention has a significantly increased activity with respect to oxidation of hydrogen, it exhibits a superior efficiency in hydrogen combustion and deoxidation and dehydrogenation of a mixed gas of hydrogen and oxygen.

What is claimed is:

1. An alloy catalyst for oxidation of hydrogen, said alloy catalyst having been prepared by heat treating a material comprising an amorphous alloy represented by the formula: $Zr_xCo_{(100-x)}$ (wherein 10 atomic % $\leq x \leq 80$ atomic % ), according to the following three steps in an oxidizing atmosphere:

first heat-treatment step at a temperature at which said alloy stably exists as an amorphous single phase for a time sufficient to concentrate Zr on the surface of the material;

second heat-treatment step at a temperature at which said alloy exists as a mixed phase of a metastable phase and an amorphous phase for a time sufficient to oxidize the concentrated Zr on the surface of the material, in preference to oxidizing Co, thereby to increase the amount of catalytically active sites on the material; and third heat-treatment step at a temperature at which said alloy is entirely transformed into a crystalline phase for a time sufficient to diffuse oxidation into the interior of the material so that the material becomes porous whereby to increase the specific surface area of the material and improve its catalytic activity.

* * * * *